2,698,802
Patented Jan. 4, 1955

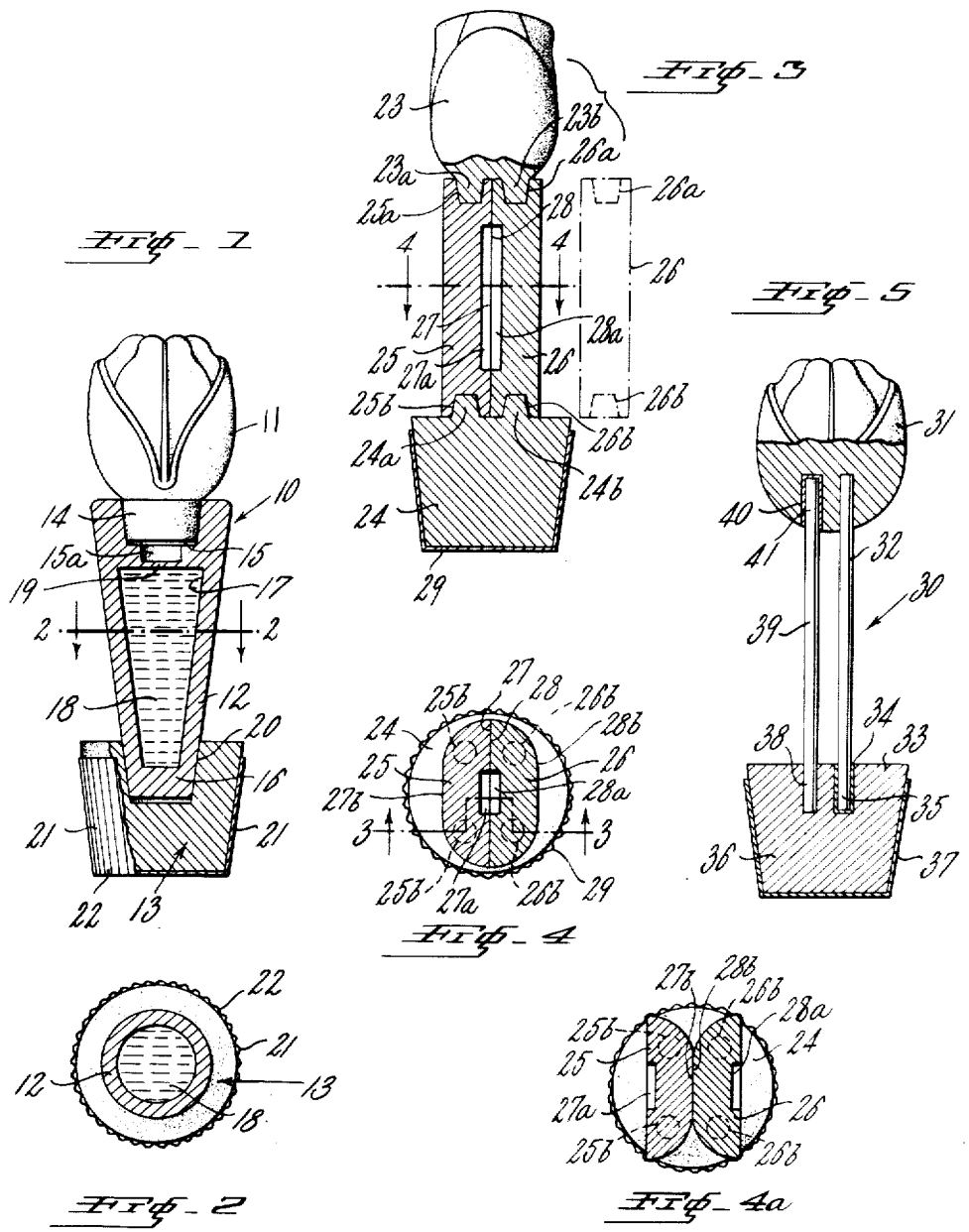

2,698,802

CONFECTIONERY ARTICLE

Jan Boon, Ardsley-on-Hudson, N. Y.

Application March 13, 1951, Serial No. 215,293

1 Claim. (Cl. 99—138)

This invention relates to a confectionery or similar article which may be made from a solid or hollow mass, such as chocolate, in which latter case the hollow space within the mass may be filled with a liquid or viscous substance such as nougat paste, liqueur and the like.

It is one of the objects of the present invention to provide means facilitating ready assembly of parts of a confectionery or like article to thereby attain a product having an improved aesthetic appearance and fulfilling many useful and educational purposes.

It is another object of the present invention to provide means contributing to a very attractive confectionery article with enhanced saleable and commercial possibilities, which may be easily manufactured and has great adaptability to different fields of use.

Yet another object of the present invention is to provide means affording interchangeability of some of the parts of the article of which the same is composed, whereby other and various effects in structure and appearance may be achieved.

With the above and other objects in view, the invention will be hereinafter more fully described and the combination and arrangement of parts will be shown in the accompanying drawing and pointed out in the claims which form part of the specification.

In the drawing:

Fig. 1 is a front elevational view of a confectionery or like article shown partly in section and embodying the features of this invention.

Fig. 2 is an enlarged cross sectional view taken along lines 2—2 of Fig. 1.

Fig. 3 is a confectionery or similar article shown in section taken along lines 3—3 of Fig. 4 and partly seen in elevation and somewhat modified with respect to the article shown in Fig. 1.

Fig. 4 is an enlarged sectional view taken along lines 4—4 of Fig. 3.

Fig. 4a is an enlarged sectional view similar to that of Fig. 4, however, with the median parts differently arranged to each other.

Fig. 5 is an elevational view of a still further modified confectionery or similar article, shown partly in section.

Referring now more particularly to the drawing there is shown in Fig. 1 a confectionery article or the like 10, representing a tulip bloom 11 with a stem 12 and a pot 13. Thus a tulip arising out of a flower pot is obtained whereby parts 11, 12 and 13 are principally made from relatively strong and durable mass, such as chocolate or similar candy composition.

The tulip head or bloom 11 is suitably molded from a solid mass and may contain or bear any coloring matter, if desired. This tulip head has an extension 14 which is somewhat downwardly tapered to fit into a hollow recess 15 correspondingly shaped and provided in the middle or stem part 12 of the article. Stem 12 has a downwardly extending conical body terminating in a conical shaped end 16.

The stem body 12 in this particular instance is hollow and provides a space 17 therein which may be filled with a suitable liquid or other viscous substance 18, such as nougat or liqueur. Recess 15 has an extension 15a which leaves a relatively thin wall piece 19 between extension 15a and hollow space 17.

Thus it will be apparent that thin wall piece 19 upon removal of flower head or bud 11 may be readily destroyed or broken to obtain access to the filling within the hollow space 17. The stem or median piece 12 may thus be employed as a cup from which the liquid or similar filling may be discharged, as will be easily understood. The lower part or pot 13 is made from a solid mass of chocolate and the like and has a conical center recess 20 into which fits the conical end 16 of the stem 12.

To give the lower or pot part 13 a better appearance and to reinforce the same a tight fitting body 21 made of metallic foil having longitudinal grooves 22 may embrace the lower part 13 as indicated in Figs. 1 and 2.

It is preferred to adapt the conicality of recess 20 to the conical shape of extension 14 so that upon removal of the stem piece or median part 12 the tulip head 11 may be readily inserted and combined with the pot 13 as may be readily understood. It is to be noted that instead of the tulip and flower pot other flowers, statues and like upright and elongated articles may form the design for such composite confectionery or like article.

Fig. 3 shows a confectionery similar to that of Fig. 1 but somewhat modified with the tulip head 23 and lower or pot part 24 arranged between separate and double stem parts 25, 26. Each stem part is provided with pairs of opposite front and rear recesses 25a, 25b and 26a and 26b. The head 23 is provided with opposite pairs of conically shaped front and rear extensions 23a and 23b adapted to fit said correspondingly shaped pairs of recesses 25a and 26a, respectively.

In a similar way pairs of conically shaped front and rear projections 24a and 24b engage pairs of front and rear recesses 25b and 26b as may be readily understood from Figs. 3 and 4. The stem parts 25 and 26 may be of semi-cylindrical or, as shown, of semi-elliptical shape (Fig. 4), whereby the abutting faces 27, 28 of said parts come to lie in contact with each other and thus bring about a sturdy composite confectionery or similar structure.

The lower part or base 24 forming the flower pot is reinforced by a suitably shaped and grooved metallic foil 29 similar to that shown at 22 in Figs. 1 and 2.

It is to be noted that the elongated stem parts 25, 26 forming a single block when in assembled condition define an inner hollow space which is composed of two recesses 27a and 28a. This hollow space may be filled with any suitable "surprise" souvenir or prize which becomes immediately accessible when the two stem parts 25 and 26 are removed from the base 24 and head 23, respectively. Upon removal of the stem parts and contrary to the configuration thereof, seen in Fig. 4, the stem parts may be arranged with their outer faces 27b and 28b in abutting relation, as seen in Fig. 4a, so that the recesses or grooves 27a and 28a come to lie remote from and opposite each other.

Fig. 3 indicates also in phantom lines stem half element 26 removed from the assembly shown in full lines in Fig. 3.

Fig. 5 shows the tulip design applied to a candy assembly structure 30. The tulip head 31 fixedly carries a stem part 32 made from wood or any other suitable material (edible or not). The base or pot 33 forming part of the assembly structure has a recess 34 in which the lower end 35 of the stick or stem part 32 is insertable and for removal therefrom.

The pot 36 which is reinforced by a metallic foil 37 (cellophane paper or the like) similar to that described with respect to Figs. 1 and 3 fixedly retains the end 38 of stem part 39 which in turn is insertable in recess 40 of the tulip head 31 and for removal therefrom.

The upper end 41 of stem part 39 may be withdrawn from the tulip recess 40 in the same manner as the end 35 of the stem part 32 may be removed from recess 34 so that the two complementary stem parts 32 and 39 provide separate holders for two differently formed (tulip and flower pot) candy shapes or lollypops.

It can be easily visualized from the aforesaid disclosure that instead of the projections 24a, 24b and recesses 25b and 26b the projections or extensions 24a, 24b may be rather arranged on the stem parts 25, 26, and the recesses provided in the lower or base part 24, so that upon removal of the stem parts the projections 23a, 23b of the tulip head 25 may be inserted into the corresponding recesses of the lower or base part.

It is further to be noted that although the invention is primarily applied to confectionery articles the same may also be employed in the field of cosmetics and related art.

In this respect it might be possible that any of the parts of the article be made from glass and may contain perfume or the head, stem and base parts may be made from soap or any other formable material or substance for the purpose intended.

It is further to be noted that the projections and recesses hereinabove mentioned and referred to with respect to Fig. 3 may not necessarily be of tapered cross section but may be cylindrical, if desired, or any other suitable connecting formations may be employed to separably attach the head to the stem and the stem to the base or pot.

Although the articles are shown unwrapped it is well understood that the parts herein illustrated may be covered with metal foil as it is usual in the chocolate or candy industry or may be packaged in any appropriate form.

It can thus be seen that there has been provided in accordance with the invention a confectionery or similar article which has as the main parts a head, a base, and intermediate or stem means extending between said head and said base, and means connecting said parts together as a unit. It is preferred to employ a one- or two-part stem means with an inner hollow pocket for suitable or desired fillings.

Having thus described the invention, what is claimed as new and desired to be secured by Letters Patent, is:

A confectionery article comprising, a head representing a flower bloom, a base representing a flower pot, stem means extending between said head and said base, said stem means including a pair of interchangeable members arranged for abutment against each other, each of said members being provided with side walls including a longitudinal groove and being further provided with end walls including at least a pair of recesses, said grooves of said members being complementary to each other to form a substantially centrally located pocket adapted to house therein a substance, and interengageable means provided on said head and on said base arranged to interchangeably connect said head with said base and alternately with said recesses of said stem means.

References Cited in the file of this patent

FOREIGN PATENTS

| | | |
|---|---|---|
| 302,303 | Great Britain | Dec. 14, 1928 |
| 467,857 | Great Britain | June 24, 1937 |
| 261,438 | Italy | Nov. 27, 1928 |
| 5,549 | Germany | June 13, 1879 |